US010263373B2

(12) United States Patent
Byrne et al.

(10) Patent No.: US 10,263,373 B2
(45) Date of Patent: Apr. 16, 2019

(54) PORTABLE TOWER WITH ELECTRICAL OUTLETS

(71) Applicants: Norman R. Byrne, Ada, MI (US); Joseph D. Ward, Grand Rapids, MI (US); Marc A. Mitchell, Belmont, MI (US)

(72) Inventors: Norman R. Byrne, Ada, MI (US); Joseph D. Ward, Grand Rapids, MI (US); Marc A. Mitchell, Belmont, MI (US)

(*) Notice: Subject to any disclaimer, the term of this patent is extended or adjusted under 35 U.S.C. 154(b) by 0 days.

(21) Appl. No.: 15/862,455

(22) Filed: Jan. 4, 2018

(65) Prior Publication Data
US 2018/0191113 A1    Jul. 5, 2018

Related U.S. Application Data

(60) Provisional application No. 62/442,022, filed on Jan. 4, 2017.

(51) Int. Cl.
| | |
|---|---|
| *H01R 25/00* | (2006.01) |
| *A47C 7/72* | (2006.01) |
| *G06F 1/26* | (2006.01) |
| *H01R 31/02* | (2006.01) |
| *H01R 24/30* | (2011.01) |

(Continued)

(52) U.S. Cl.
CPC .......... *H01R 25/006* (2013.01); *A47C 7/725* (2013.01); *G06F 1/26* (2013.01); *H01R 13/6666* (2013.01); *H01R 24/30* (2013.01); *H01R 25/003* (2013.01); *H01R 31/02* (2013.01); *H02G 3/0493* (2013.01); *H02J 4/00* (2013.01); *H02J 7/00* (2013.01); *H01R 13/6675* (2013.01);

(Continued)

(58) Field of Classification Search
CPC .... H01R 25/006; H01R 25/003; H01R 13/70; H01R 27/02
USPC ........................................................ 439/535
See application file for complete search history.

(56) References Cited

U.S. PATENT DOCUMENTS

| | | |
|---|---|---|
| D244,465 S | 5/1977 | Stoneman |
| 4,519,657 A | 5/1985 | Jensen |

(Continued)

FOREIGN PATENT DOCUMENTS

| | | |
|---|---|---|
| CN | 105212668 | 1/2016 |
| DE | 3633844 | 2/1987 |

(Continued)

*Primary Examiner* — Alexander Giman
(74) *Attorney, Agent, or Firm* — Gardner, Linn, Burkhart & Ondersma LLP

(57) ABSTRACT

A portable tower with electrical capability includes a housing with base, central, and upper housing portions, and with electrical power and/or data outlets including at least one outlet at either or both of the upper and lower housing portions. The central housing portion projects upwardly from the base housing portion and supports the upper housing portion at an elevated position spaced above the base housing portion. The electrical power and/or data outlets are in electrical communication with a power or data source, such as a remote source or an onboard source as in a rechargeable battery or capacitor. Where an onboard source is provided, the portable tower is positionable in substantially any desired location and is capable of providing electrical power to other devices when there is sufficient energy stored in the onboard source.

20 Claims, 14 Drawing Sheets

(51) Int. Cl.

| | |
|---|---|
| *H01R 13/66* | (2006.01) |
| *H02J 4/00* | (2006.01) |
| *H02J 7/00* | (2006.01) |
| *H02G 3/04* | (2006.01) |
| *H01R 13/70* | (2006.01) |
| *H01R 27/02* | (2006.01) |
| *H01R 103/00* | (2006.01) |

(52) U.S. Cl.
CPC .............. *H01R 13/70* (2013.01); *H01R 27/02* (2013.01); *H01R 2103/00* (2013.01)

(56) References Cited

U.S. PATENT DOCUMENTS

| | | | |
|---|---|---|---|
| 4,780,571 A | 10/1988 | Huang | |
| 5,230,552 A | 7/1993 | Schipper et al. | |
| 5,452,807 A | 9/1995 | Foster et al. | |
| D367,530 S | 2/1996 | Stith | |
| 5,819,405 A | 10/1998 | Marder et al. | |
| 5,921,795 A | 7/1999 | Weener et al. | |
| 6,017,228 A | 1/2000 | Verbeek et al. | |
| 6,024,588 A * | 2/2000 | Hsu | H01R 31/02 439/173 |
| D426,520 S * | 6/2000 | Goins | D13/139.1 |
| 6,135,622 A | 10/2000 | Downing | |
| D434,502 S | 11/2000 | Gallant | |
| 6,264,016 B1 | 7/2001 | Bales | |
| 6,364,678 B1 | 4/2002 | Hellwig et al. | |
| D473,518 S | 4/2003 | Hellwig et al. | |
| 6,581,890 B2 | 6/2003 | Johnson et al. | |
| 6,653,562 B2 | 11/2003 | Kochanski et al. | |
| 6,805,581 B2 * | 10/2004 | Love | H01R 13/447 439/367 |
| 6,940,015 B2 * | 9/2005 | Fang | H01R 13/465 174/50 |
| 7,004,786 B1 * | 2/2006 | Bloom | H01R 13/72 439/142 |
| D534,869 S | 1/2007 | Stekelenburg | |
| 7,227,081 B2 | 6/2007 | Bally et al. | |
| 7,442,090 B2 * | 10/2008 | Mori | H01R 25/003 174/53 |
| 7,611,364 B2 * | 11/2009 | Kidman | H01R 13/447 174/66 |
| 7,862,385 B2 * | 1/2011 | Lee | H01R 13/70 439/652 |
| 7,897,277 B2 * | 3/2011 | Meyer | F21L 2/00 429/100 |
| 7,989,738 B2 * | 8/2011 | Byrne | A47J 36/2461 219/452.11 |
| 8,193,768 B2 | 6/2012 | Hallett | |
| D669,856 S | 10/2012 | Rosendahl | |
| D691,953 S | 10/2013 | Chayer | |
| 8,545,039 B2 * | 10/2013 | Patel | F21S 6/002 307/43 |
| 8,558,410 B2 | 10/2013 | Itkonen | |
| D692,831 S | 11/2013 | Beldock et al. | |
| D693,307 S * | 11/2013 | Beldock | D13/139.4 |
| D693,308 S * | 11/2013 | Beldock | D13/139.4 |
| 8,723,055 B2 | 5/2014 | Beldock et al. | |
| 8,783,936 B2 * | 7/2014 | Chien | F21S 8/035 362/157 |
| D712,838 S | 9/2014 | Beldock et al. | |
| 9,000,298 B2 * | 4/2015 | Byrne | H02G 3/14 174/66 |
| 9,088,088 B1 | 7/2015 | Black et al. | |
| 9,088,117 B2 | 7/2015 | Rosenblum | |
| 9,124,044 B2 | 9/2015 | Beldock et al. | |
| 9,178,324 B2 | 11/2015 | Beldock et al. | |
| 9,362,696 B1 | 6/2016 | Black et al. | |
| D761,733 S | 7/2016 | Sumwalt et al. | |
| D762,177 S | 7/2016 | Sumwalt et al. | |
| 9,438,070 B2 | 9/2016 | Byrne et al. | |
| 9,447,961 B1 * | 9/2016 | Yousafi | F21V 33/0024 |
| 9,484,751 B2 | 11/2016 | Byrne et al. | |
| 9,608,455 B2 | 3/2017 | Byrne et al. | |
| 9,685,730 B2 | 6/2017 | Jones et al. | |
| D806,035 S * | 12/2017 | Byrne | D13/139.5 |
| 2004/0026998 A1 | 2/2004 | Henriott et al. | |
| 2006/0126243 A1* | 6/2006 | Cheng | H01R 13/6675 361/62 |
| 2008/0032528 A1 | 2/2008 | Lai | |
| 2011/0197794 A1 | 8/2011 | Nunes | |
| 2012/0289081 A1* | 11/2012 | Izzard | H01R 25/003 439/535 |
| 2013/0126540 A1 | 5/2013 | Vesterby | |
| 2014/0111158 A1 | 4/2014 | Kinomura et al. | |
| 2015/0108841 A1* | 4/2015 | Weber | H02J 4/00 307/31 |
| 2015/0263547 A1 | 9/2015 | Browne | |
| 2016/0079721 A1* | 3/2016 | Jones | H01R 13/5202 439/587 |
| 2016/0372962 A1 | 12/2016 | Byrne et al. | |

FOREIGN PATENT DOCUMENTS

| | | |
|---|---|---|
| DE | 19606193 | 8/1997 |
| DE | 102008001461 | 11/2009 |
| EP | 1441421 | 7/2004 |
| EP | 2128936 | 12/2009 |
| FR | 2823912 | 10/2002 |
| GB | 1464379 | 2/1977 |
| GB | 2303000 | 2/1997 |
| JP | 2002110302 | 4/2002 |
| WO | 9749161 | 12/1997 |

* cited by examiner

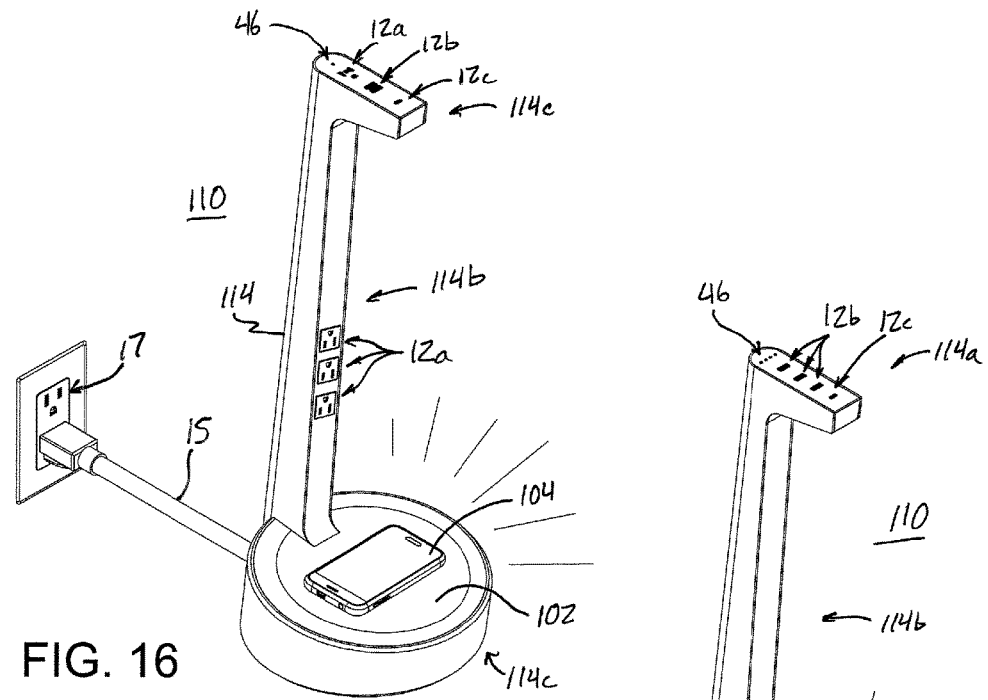
FIG. 16
FIG. 17
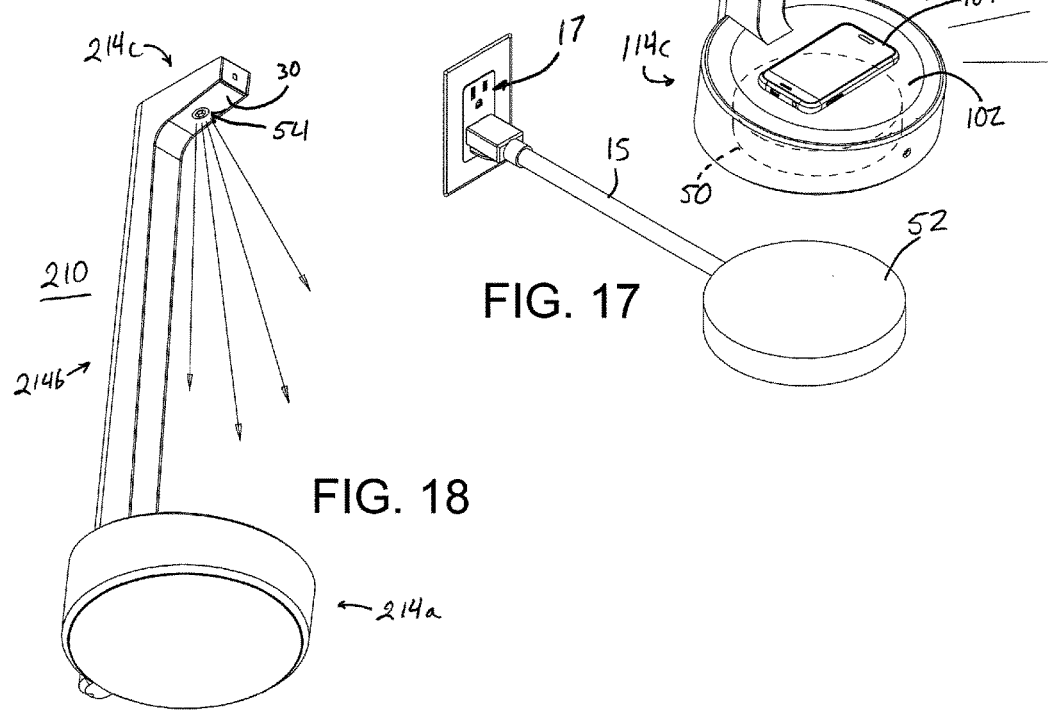
FIG. 18

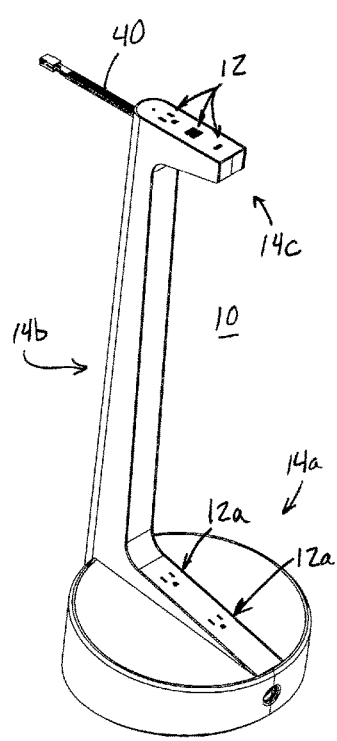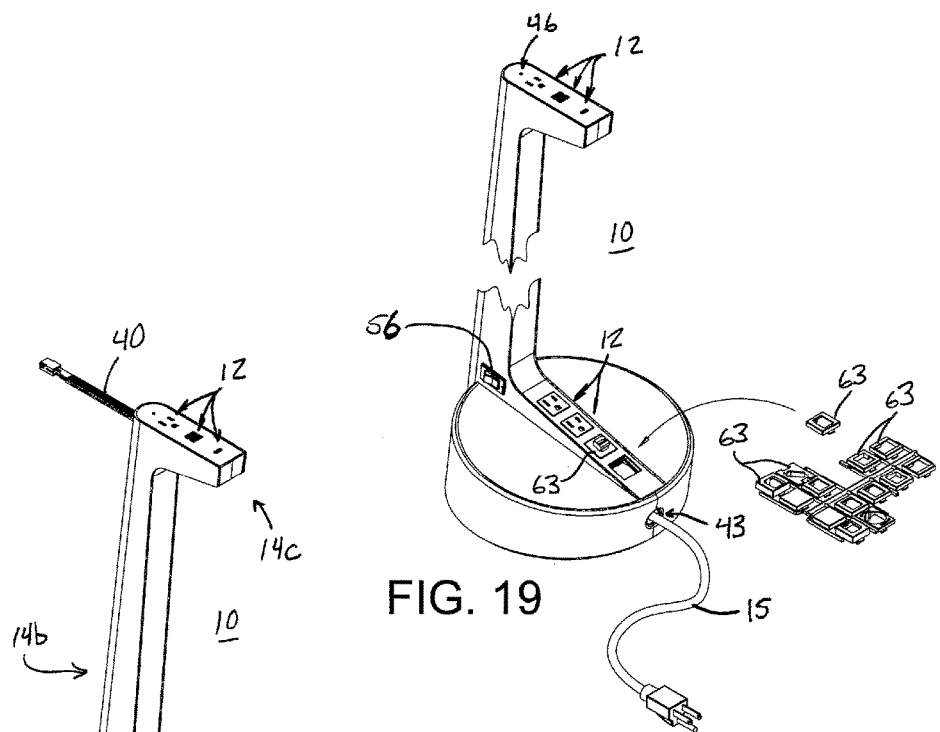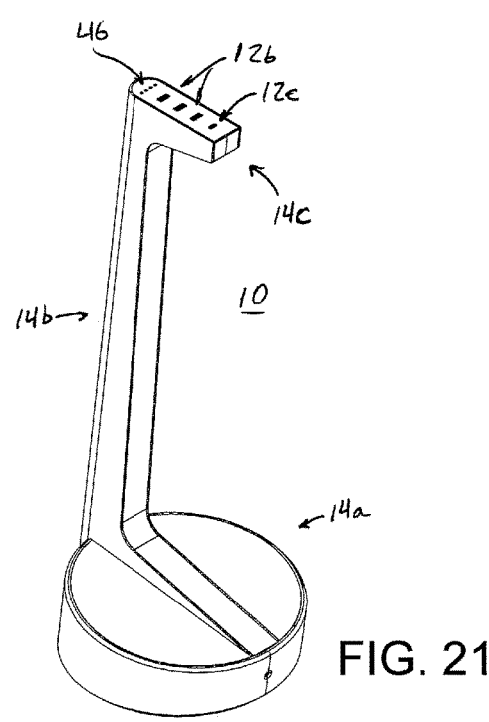
FIG. 20
FIG. 19
FIG. 21

PORTABLE TOWER WITH ELECTRICAL OUTLETS

CROSS REFERENCE TO RELATED APPLICATION

The present application claims the benefit of U.S. provisional application Ser. No. 62/442,022, filed Jan. 4, 2017, which is hereby incorporated herein by reference in its entirety.

FIELD OF THE INVENTION

The present invention relates to portable articles having electrical power and/or data outlets for electrical and electronic devices.

BACKGROUND OF THE INVENTION

As electrical and electronic devices, and especially portable electronic devices having rechargeable batteries, become more ubiquitous, it is increasingly desirable to provide convenient access to electrical outlets for recharging and/or powering those devices.

SUMMARY OF THE INVENTION

The present invention provides portable tower with electrical capability, which is configured to be supported on a floor, table, or other support surface, and which is readily repositioned to desired locations to provide users with convenient access to power and/or electronic data signals. In some embodiments, the outlets are energized by an onboard power source such as a rechargeable battery or capacitor, which can be recharged via a charging cord or a wireless power transmitter. In other embodiments, the outlets are energized by an outside power and/or electronic data source, such as via a wall or floor outlet. In still further embodiments, a combination of outside and onboard power sources may be utilized and controlled by an onboard controller. The portable tower has a housing that is shaped to facilitate resting the tower on a floor surface, and to facilitate manually grasping and relocating the tower as desired.

According to one form of the present invention, a portable tower with electrical capability includes a housing with first and second electrical outlets, and electrical conductors for supplying electrical power and/or electronic data signals to the outlets. The housing includes a base housing portion, an upstanding central housing portion that extends upwardly from the base housing portion, and an upper housing portion located at an upper end of the central housing portion. The first electrical outlet is mounted at the upper housing portion, and the second electrical outlet is mounted at the base housing portion. The electrical conductors extends through the base housing portion, through the upstanding central housing portion, and through the upper housing portion, and is in electrical communication with an electrical source such as an onboard rechargeable battery or an external power source such as a wall or floor outlet located in a work area.

In one aspect, the portable tower includes the source, such as a rechargeable battery or capacitor, mounted in the base housing portion. Optionally, there is provided a charging jack configured to receive electrical power from a connector that is in electrical communication with an external power source, or there may be provided a wireless electrical power receiver in the base housing portion for receiving electrical power from a wireless electrical power transmitter that receives power from an external power source such as a wall or floor outlet.

In another aspect, a charging circuit selectively directs electrical power received from the charging jack, or from the wireless electrical power receiver, to the battery, capacitor, or other rechargeable electrical energy storage device.

In yet another aspect, there is an energizing circuit for selectively directing electrical power received from the source to the first and second electrical outlets.

In still another aspect, an electric lamp is positioned in the upper housing portion and is configured to illuminate at least the base housing portion.

In a further aspect, the second electrical outlet includes a wireless electrical power transmitter, and the base housing portion includes an upper support surface that can support a portable electronic device during wireless charging of the portable electronic device by the wireless electrical power transmitter.

In a still further aspect, an electrical power cord and plug are electrical communication with the first and second electrical outlets. The plug is configured to engage the source to thereby receive electrical power or electronic data signals from the source.

In yet another aspect, the first electrical outlet includes at least one low voltage DC power outlet. Optionally, the portable tower includes an electrical power converter in electrical communication with the source and with the low voltage DC power outlet. The electrical power converter is configured to receive a high voltage AC power input from the source and to supply a low voltage DC power output to the at least one low voltage DC power outlet. Optionally, the electrical power converter is mounted in the upstanding central housing portion.

In another aspect, the second electrical outlet includes at least one high voltage AC power outlet.

Optionally, the first and second electrical outlets are mounted on respective upwardly-facing surfaces of the base housing portion and the upper housing portion.

In a further aspect, there is a third electrical outlet at the upper housing portion, and a modular outlet support disposed in the upper housing portion. The modular outlet support defines separate openings each configured to interchangeably receive either of the first and third electrical outlets.

According to one form of the present invention, a portable tower with electrical capability includes a housing, a modular outlet support, first and second electrical outlets, and electrical conductors for supplying electrical power and/or electronic data signals to the outlets. The housing includes a base housing portion, an upstanding central housing portion extending upwardly from the base housing portion, and an upper housing portion located at an upper end of the central housing portion. The modular outlet support is positioned in either the upper housing portion or the base housing portion, and the modular outlet support and defines first and second openings. The first electrical outlet is mounted in the first opening and the second electrical outlet is mounted in the second opening. The modular outlet support is configured to support each of the first and second outlets in either of the first and second openings, thus making the outlets interchangeable with one another. The electrical conductors are in electrical communication with the first and second electrical outlets and also with an electrical source such as an onboard rechargeable battery or an external power source such as a wall or floor outlet located in a work area.

Accordingly, the portable tower of the present invention provides users of a work area with convenient and portable access to electrical outlets, such as for recharging portable electronic devices or for powering computers or electrical or electronic appliances or devices. The portable tower may have the modular capability for providing different types of outlets as desired for a particular applications, such as low voltage DC power outlets, high voltage AC power outlets, electronic data outlets, or combinations of those. In some embodiments the portable tower may be powered by a conventional cord and plug that engage a wall outlet or floor outlet, while in others the portable tower has an onboard rechargeable power supply capable of providing at least a limited amount of DC low voltage power at substantially any desired location, without relying on a cord connection to an external power source.

These and other objects, advantages, purposes and features of the present invention will become apparent upon review of the following specification in conjunction with the drawings.

BRIEF DESCRIPTION OF THE DRAWINGS

FIG. 16 is a perspective view of another portable tower with electrical outlets and wireless charging capability along the base portion, in accordance with the present invention;

FIG. 17 is a perspective view of a wireless charger in combination with another cordless portable tower with electrical outlets, wireless charging capability, and wireless recharging capability, in accordance with the present invention;

FIG. 18 is a bottom perspective view of another portable tower with electrical outlets and down-lighting in the upper portion;

FIG. 19 is a perspective view of another portable tower with modular electrical outlets, in accordance with the present invention;

FIG. 20 is a perspective view of another portable tower with electrical outlets, in accordance with the present invention; and FIG. 21 is a perspective view of another portable tower with electrical outlets only at its upper portion, in accordance with the present invention.

DESCRIPTION OF THE PREFERRED EMBODIMENTS

Figure 1:
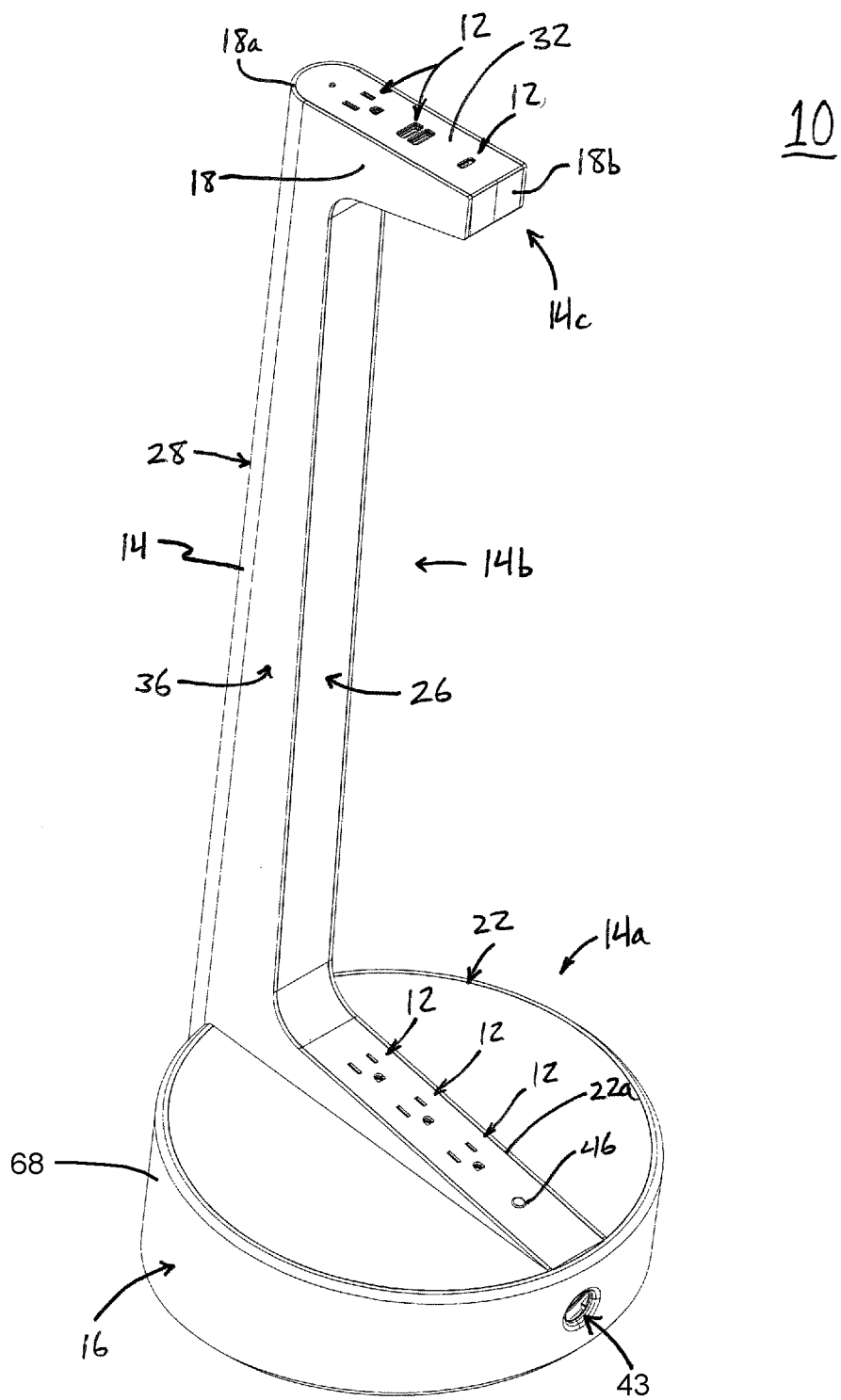
FIG. 1 is a perspective view of a portable tower with electrical outlets, in accordance with the present invention.

Referring now to the drawings and the illustrative embodiments depicted therein, a portable tower 10 provides users with convenient access to electrical power and/or data outlets 12 that are mounted at different locations along a tower housing 14 (FIG. 1). Throughout this description the term "electrical outlet" may be used to refer to electrical power outlets and/or electronic data outlets. Tower housing 14 includes a base housing or base housing portion 14a, an upstanding central housing portion 14b that extends up from base housing 14a, and an upper housing or upper housing portion 14c that is positioned at an upper end of central housing portion 14b and spaced above the base housing portion 14a. Upper housing portion 14c is sized and shaped to be grasped by a user for ease of repositioning the portable tower 10 to desired locations, and is positioned a sufficient height to be grasped by a user who is standing or sitting while the portable tower 10 is resting on a floor or similar support surface. Various embodiments, including those of FIGS. 1-6, 11-16, 19 and 20, may receive electrical power via a cord 15 connected to an outside source 17 such as shown in FIGS. 16 and 19, while other embodiments such as those of FIGS. 7-10, 17 and 21 energize their outlets using an onboard power source such as a battery pack or other electrical storage device, or a combination of external power and onboard power sources. These and various other features and options will be described below in more detail.

Although it will be appreciated that many different shape configurations for the portable tower's housing are possible, in the illustrated embodiments base housing portion 14a has a base housing piece 68 with a generally circular outer periphery 16 that is substantially circular when viewed from above. Upper housing portion 14c has a generally rectangular outer periphery 18 with a rounded proximal end 18a and a squared distal end 18b that extends laterally over base housing portion 14a in a cantilevered manner. Central housing portion 14b extends upwardly from one side of upper housing 14a at an oblique angle so that upper housing portion 14c is substantially centered relative to the base housing portion 14a when viewed from above. The overall horizontal length of upper housing portion 14c is less than the diameter of the base housing's outer periphery 16 so that outer periphery would appear to encircle upper housing portion 14c when portable tower 10 is viewed from above.

Figure 2:
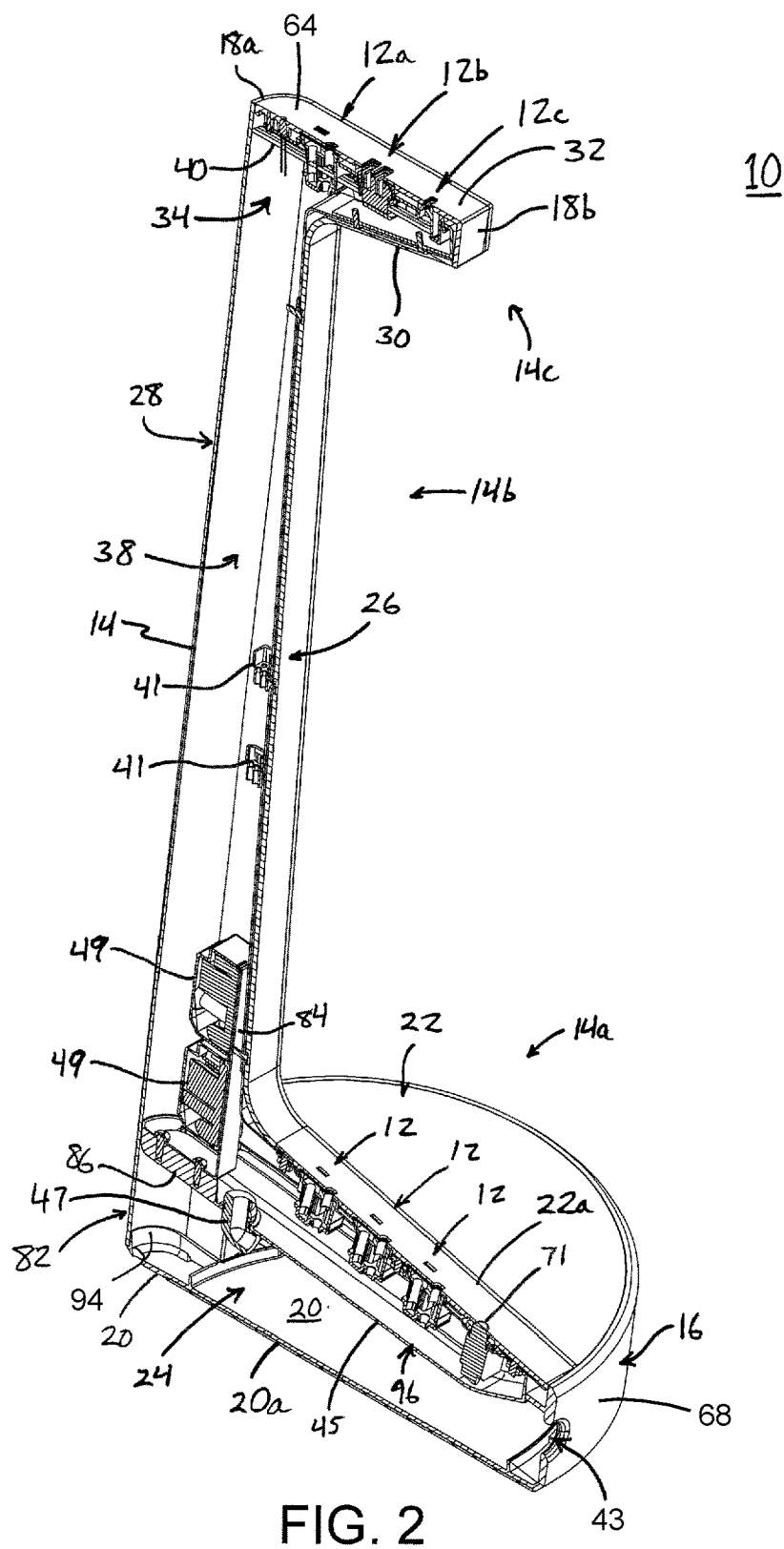
FIG. 2 is a cutaway perspective view of the portable tower of FIG. 1, showing internal structure.
Figure 3:
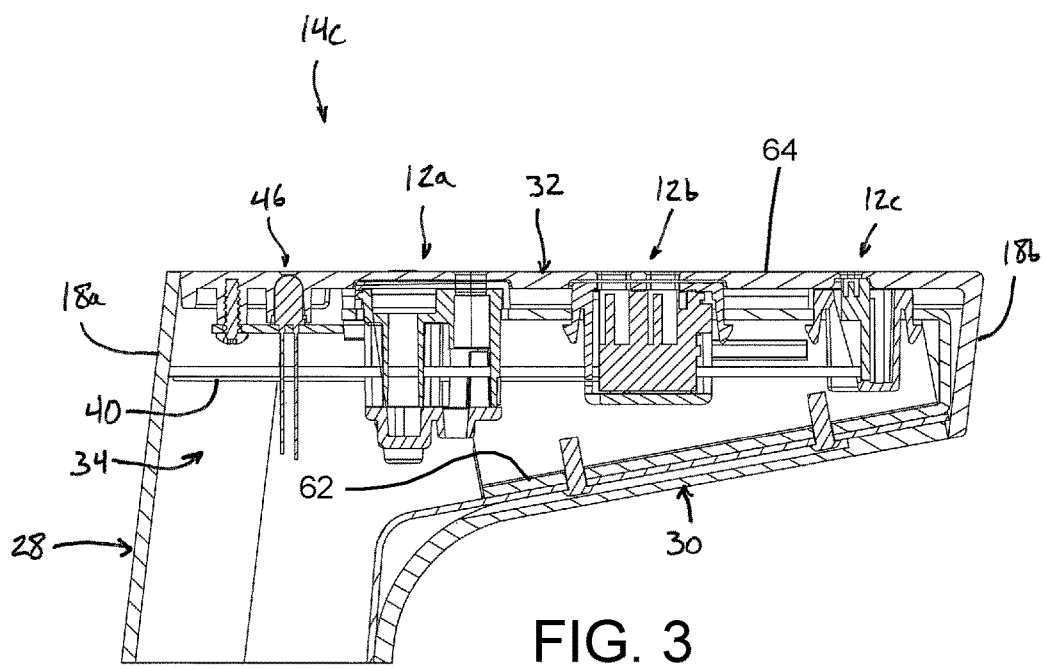
FIG. 3 is an enlarged sectional side view of an upper portion of the portable tower of FIG. 1.
Figure 4:
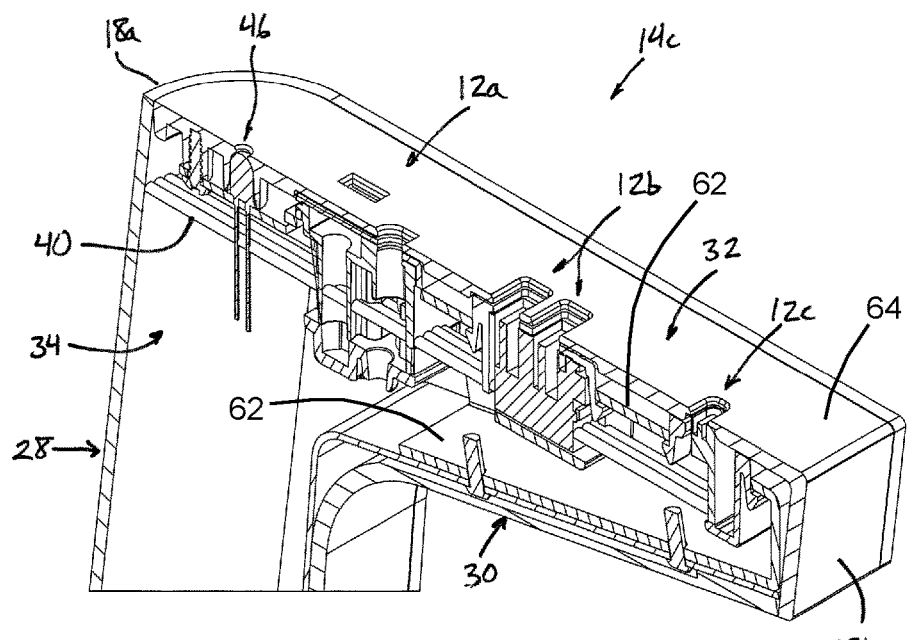
FIG. 4 is a perspective view of the upper portion of FIG. 3.

Base housing portion 14a further includes a bottom panel 20 (with skid pad 20a) and a top panel 22 that cooperate with base housing piece 68 to define a base cavity 24 where electrical components are mounted, as will be described below. Top panel 22 includes a raised central outlet portion 22a where outlets 12 are mounted, with the raised central outlet portion 22a being angled relative to horizontal and relative to a pair of outboard top panel portions 22b located on either side of central outlet portion 22a. Central outlet portion 22a transitions to an inwardly-facing planar surface 26 of central housing portion 14b, which also has an outwardly-facing rounded surface 28 that extends generally from circular outer periphery 16 of base housing portion 14a to the rounded proximal end 18a of the rectangular outer periphery 18 of upper housing portion 14c. Inwardly-facing planar surface 26 of central housing portion 14b transitions to a downwardly-facing bottom surface 30 of upper housing portion 14c, which has an upwardly-facing top surface 32 spaced above bottom surface 30 by the generally rectangular outer periphery 18, with those surfaces 18, 30, 32 cooperating to define an upper cavity 34 where additional electrical components are mounted, such as shown in FIGS. 2-4.

In the illustrated embodiment, bottom surface 30 is angled upwardly relative to the horizontal in the direction away from central housing portion 14b, while top surface 32 is substantially horizontal and parallel to bottom panel 20 of base housing portion 14a. Inwardly-facing planar surface 26 and outwardly-facing rounded surface 28 of central housing portion 14b cooperate with a pair of side surfaces 36 to define an elongate central cavity 38 that is at least partially open to base cavity 24 and upper cavity 34 to permit the passage of wiring or other conductors, described below. Central housing portion 14b may have a sufficient length so that top surface 32 of upper housing portion 14c is approximately 24-inches to 36-inches above a support surface on which bottom panel 20 (optionally with skid pad 20a) is resting.

Optionally, various surfaces of at least central housing portion 14b and upper housing portion 14c may be unitarily formed, such as of resinous plastic in an injection molding operation. In the illustrated embodiment of FIGS. 1-6, top surface 32 of upper housing portion 14c and bottom panel 20 of base portion 14a are each manufactured as separate components, which are removable to expose the upper cavity 34 and base cavity 24, respectively. Optionally, and as will be described in more detail below, the raised central outlet portion 22a of the base housing's top panel 22 can accommodate different types or styles of electrical outlets 12. The various components that are assembled together to form housing 14 may be attached using threaded fasteners, magnetic fasteners, snap fasteners such as resilient latch-tabs, or more permanent means such as ultrasonic welding or adhesives.

Figure 7:
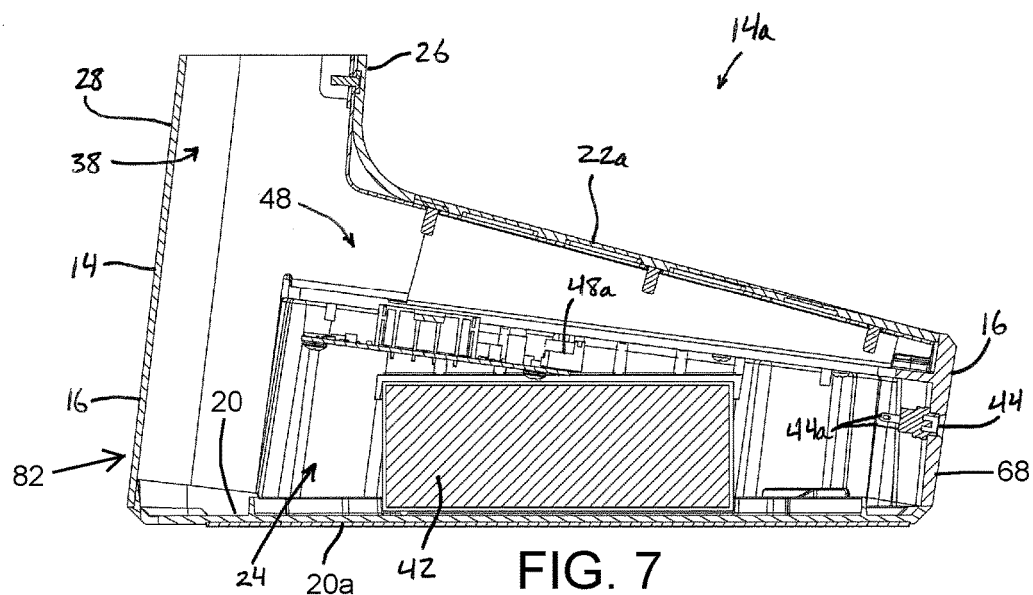
FIG. 7 is an enlarged sectional side view of an upper portion of a cordless portable tower with electrical outlets, in accordance with the present invention.

As shown in FIGS. 1-4, outlets 12 at upper housing portion 14c include a high voltage AC power outlet 12a (illustrated as a standard NEMA 110V AC outlet) and low voltage DC power outlets 12b, 12c (illustrated as USB-A power outlets 12b and USB-C power outlets 12c). However, it will be appreciated that substantially any configuration, style, voltage, and capacity of high voltage and/or low voltage outlets may be provided, without departing from the spirit and scope of the present invention. For both externally-powered (corded) and cordless embodiments, electrical wiring 40 is routed into upper cavity 34 of upper housing portion 14c through base cavity 24 and central cavity 38 (FIG. 7). Wiring clips or retainers 41 (FIGS. 2, 2A and 12) are located inside central cavity 38 and are used to secure the wiring 40 as it passes through central cavity 38 between base cavity 24 and upper cavity 34. However, it will be appreciated that wiring 40 for the outlets 12 could be routed out through upper housing portion 14c such as shown in FIG. 20. As will be understood with reference to FIG. 2A, wiring 40 may include a high voltage AC wire 40a carrying the same voltage as power cord 15, and a low voltage DC wire 40b that carries low voltage DC power to low voltage DC outlets 12b, 12c.

Figure 2A:
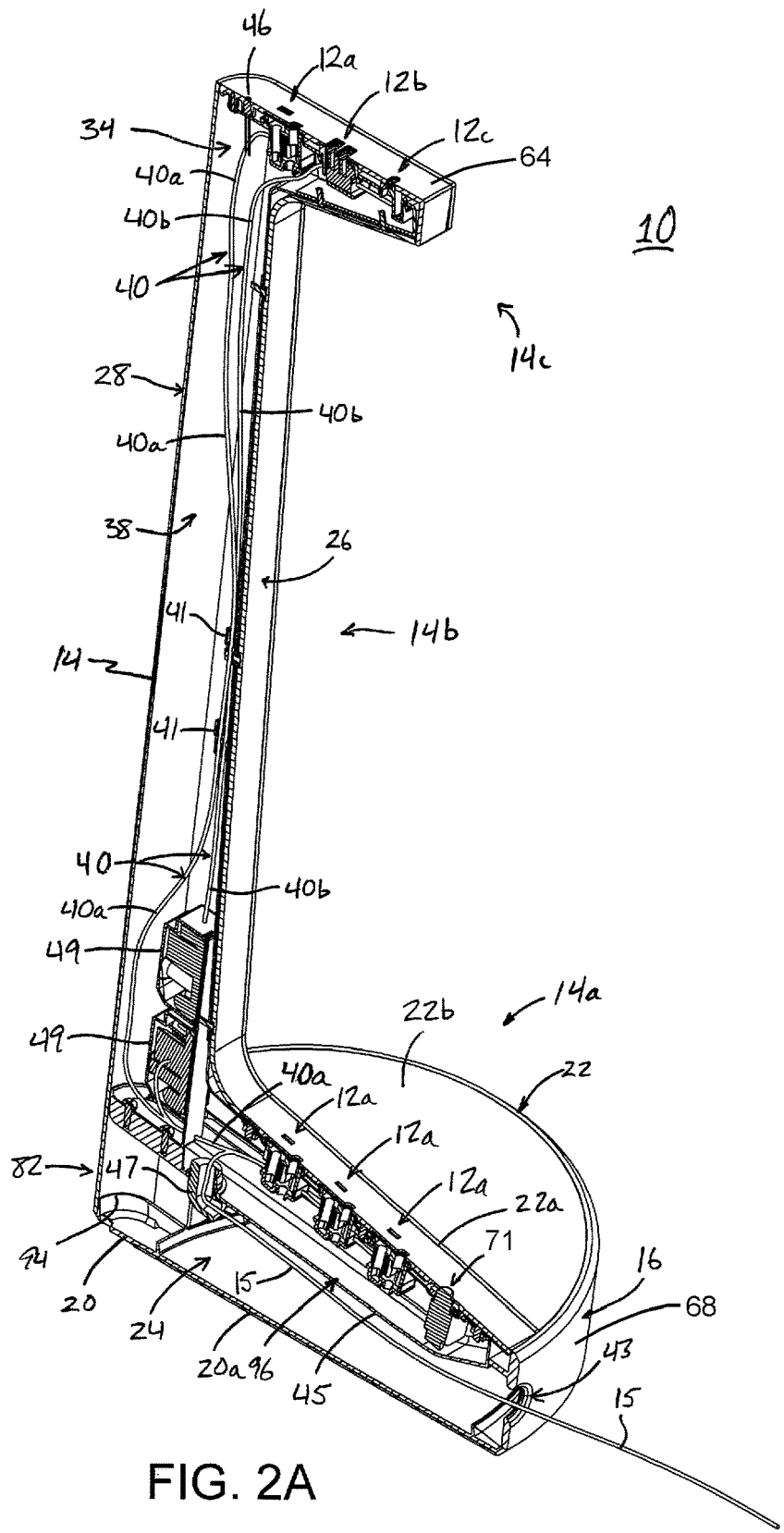
FIG. 2A is another cutaway perspective view of the portable tower of FIG. 1, showing internal structure including wiring.

In the embodiment of FIGS. 1-6, and as best shown in FIG. 2A, the electrical power cord 15 enters base housing 14a through an opening 43 formed in the circular outer periphery 16 of base housing piece 68, passes beneath most of a lower receptacle housing panel 45, then up through a wire grommet 47 in an opening formed in the lower receptacle housing panel 45. Wire grommet 47 forms a 90-degree passageway for the power cord 15, and although the diameter of the power cord 15 appearing FIG. 2A is much smaller than the inner diameter of the passageway through wire grommet 47, it will be appreciated that the inner diameter of the passageway would normally be sized to create an interference fit with the outer jacket of the power cord 15, thereby providing a strain relief.

High voltage AC wire 40a may be directly coupled to the conductors of the electrical power cord 15, and then directly couple to the respective line, neutral, and ground terminals of the high voltage AC power outlets 12a, while additional conductors supply high voltage AC power to a pair of AC-to-DC electrical converters 49, which supply low voltage DC power to the low voltage DC outlets 12b, 12c located in upper housing 14c via the low voltage DC wire 40b (FIG. 2A). Still further conductors in direct communication with the wiring of the electrical power cord may pass through the central cavity 38 of central housing portion 14b and supply power to one or more high voltage AC power outlets 12a located in the upper housing 14c. Thus, wiring clips or retainers 41 may secure both high voltage and low voltage conductors, as shown in FIG. 2A. To the extent that it may be desirable to transmit electronic data signals through low voltage conductors in some embodiments, it will be appreciated that appropriate electrical shielding may be used for low voltage conductors that are in close proximity to high voltage AC conductors.

Optionally, when an external cord 15 is used to supply charging power (e.g., to storage device 42) or to supply power directly to outlets 12, a rotary cord winder (not shown) may be provided in the base housing portion 14a, such as in the base cavity 24. The cord winder is operable to selectively store the electrical power cord in a retracted configuration when it is not in use. It is further envisioned that excess cord may be manually wrapped around central housing portion 14b.

Figure 8:
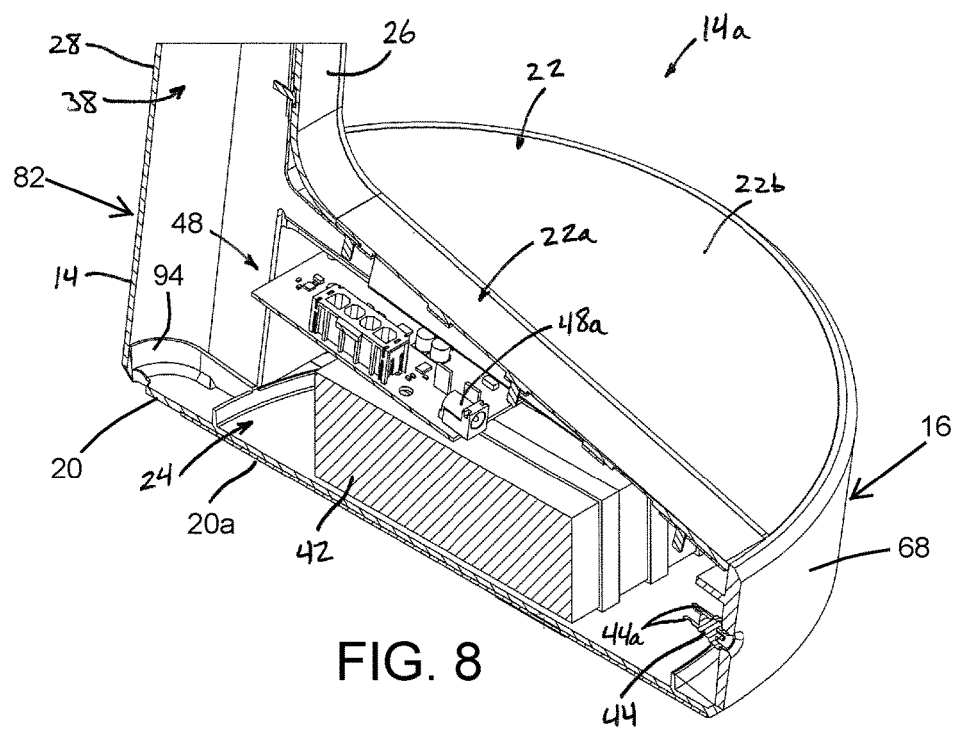
FIG. 8 is a perspective view of the upper portion of FIG. 7.

Cordless embodiments of the portable tower 10 include rechargeable electrical energy storage device 42, such as a battery or capacitor, located in the base cavity 24 of base housing portion 14a, such as shown in FIGS. 7 and 8. Battery 42 is supported atop bottom panel 20 and is capable of supplying a limited amount of electrical power to at least low voltage DC electrical outlets 12b and/or 12c located substantially anywhere along the housing 14. By positioning battery 42 at the lowest location in housing 14, it may act as a weight ballast for stabilizing portable tower 10 on a floor surface or other support surface.

Battery 42 may be recharged via direct electrical connection to a charging jack 44 located at a front end of outer periphery 16. Charging jack 44 is configured to be engaged by a conventional coaxial DC power plug at the end of a wire that is connected to a DC transformer (not shown), which plugs into a conventional high voltage AC wall or floor outlet, for example. Charging jack 44 supplies charging power directly to battery 42, or through a charging circuit 48 that manages incoming charging power, and which may also act as an energizing circuit that manages the supply of electrical power from battery 42 to low voltage DC outlets 12b and/or 12c. Although not shown in FIGS. 7 and 8, it will be appreciated that a wire having at least two conductors and at least one connector would be used to establish an electrical connection from terminals 44a on charging jack 44 to a connector 48a on charging circuit 48, engaging the charging circuit connector 48a with the wire's connector.

Figure 9:
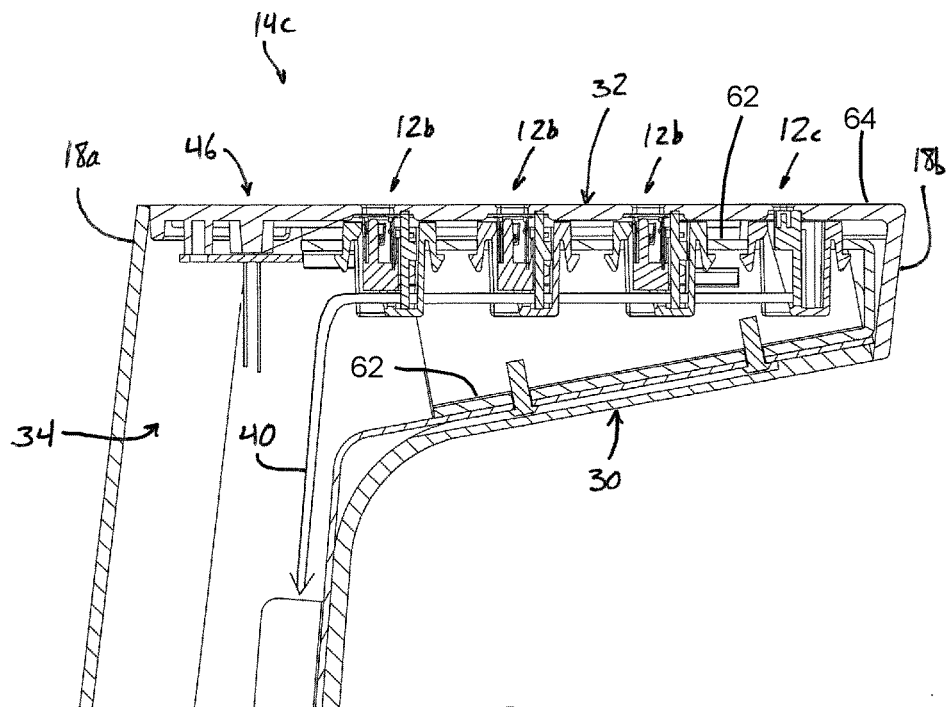
FIG. 9 is an enlarged sectional side view of a lower portion of the cordless portable tower corresponding to the upper portion of FIGS. 7 and 8.
Figure 10:
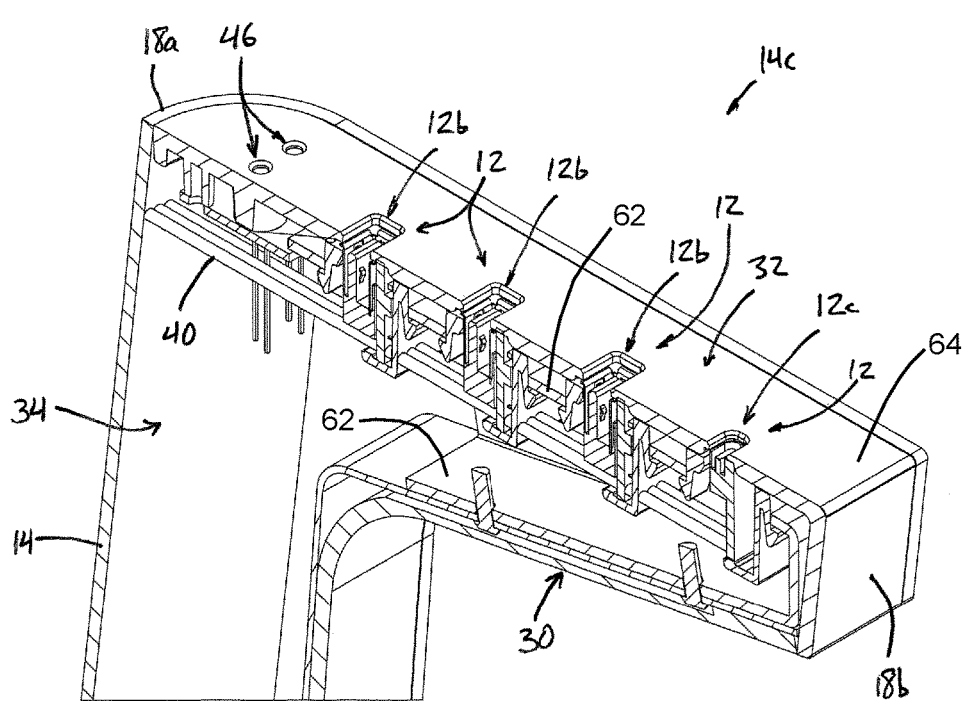
FIG. 10 is a perspective view of the lower portion of FIG. 9.
Figure 11:
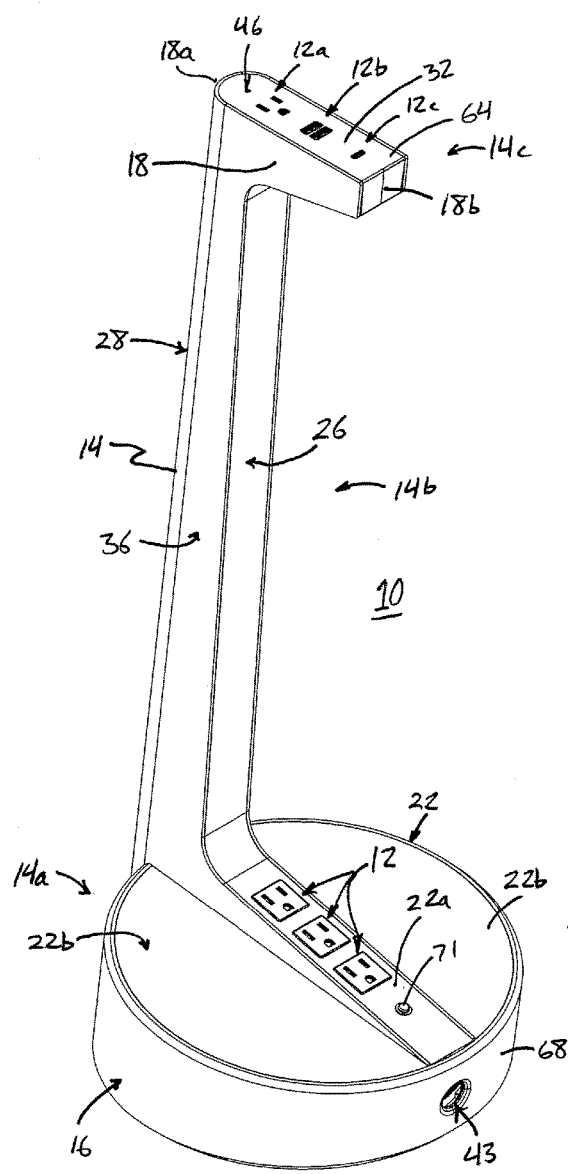
FIG. 11 is a perspective view of another portable tower with modular electrical outlets, in accordance with the present invention.
Figure 12:
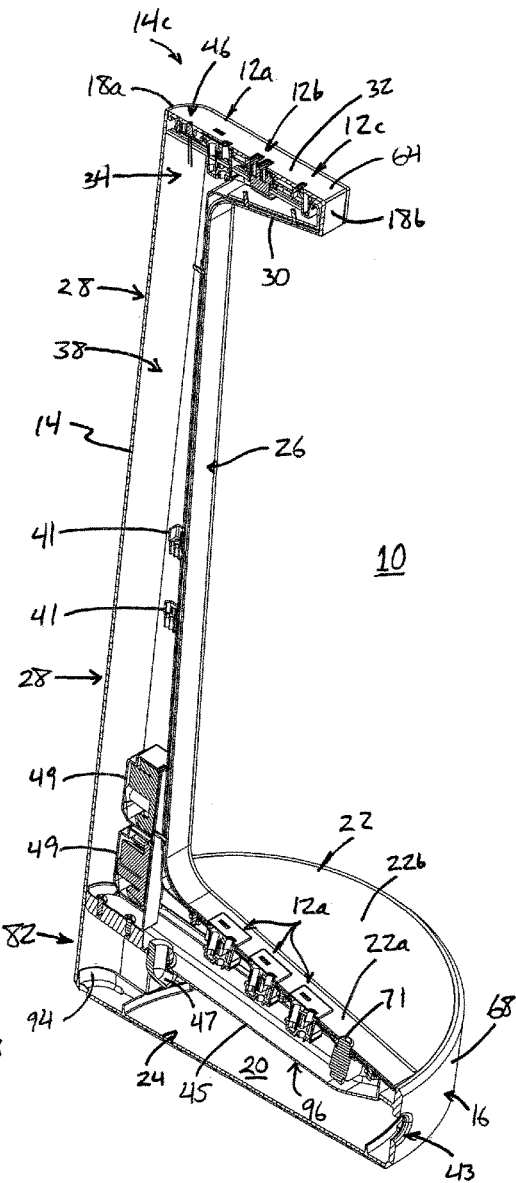
FIG. 12 is a cutaway perspective view of the portable tower of FIG. 11, showing internal structure.
Figure 13:
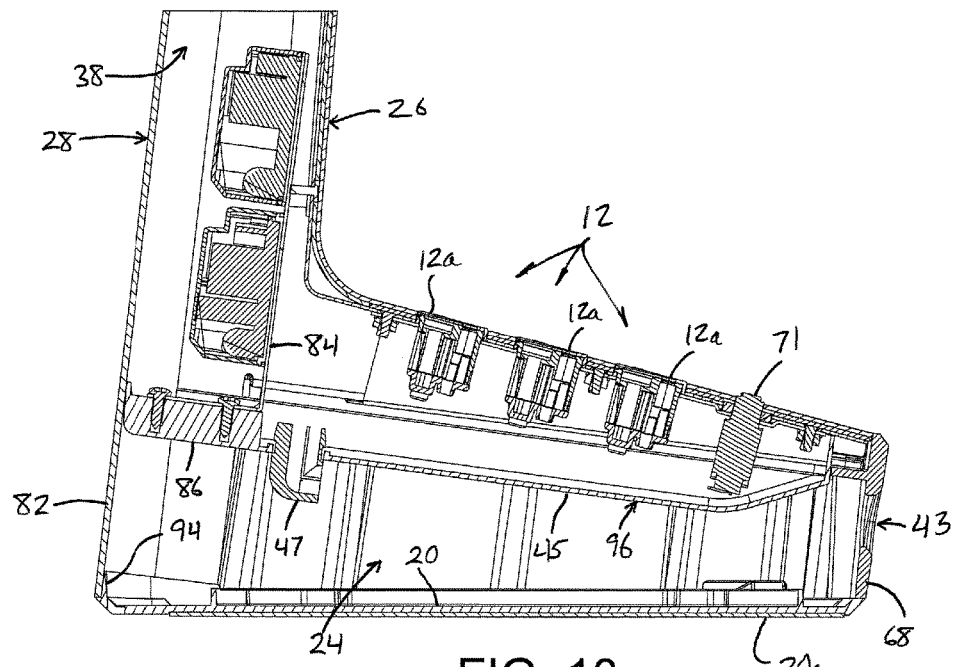
FIG. 13 is an enlarged sectional side view of a lower portion of the portable tower of FIG. 11.
Figure 14:
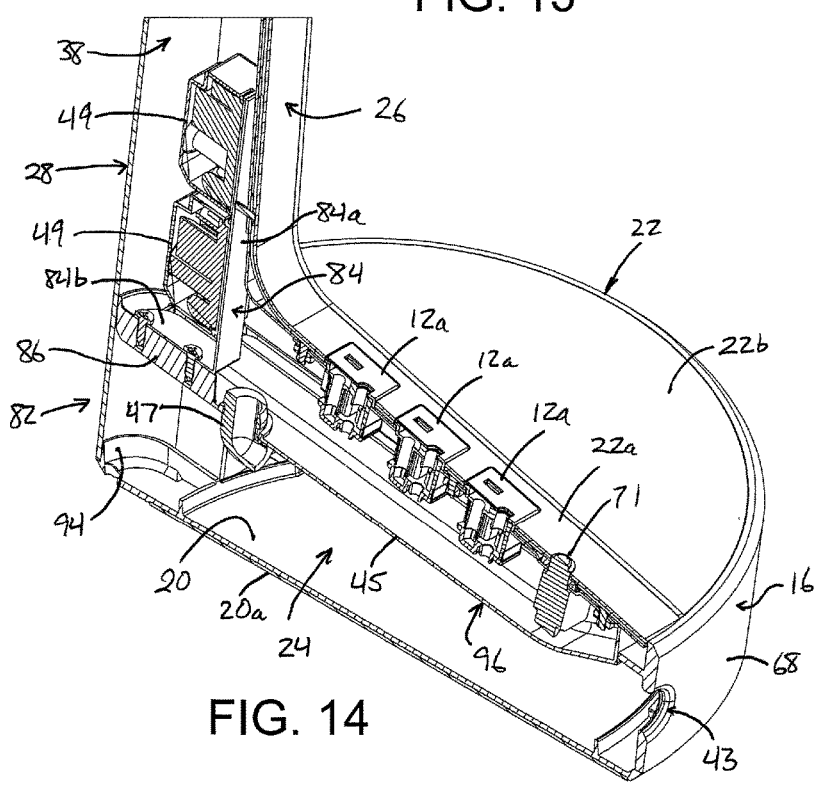
FIG. 14 is a perspective view of the lower portion of FIG. 13.

When portable tower 10 is provided with a rechargeable electrical energy storage device 42 as shown in FIGS. 7 and 8, the electrical outlets 12 provided at the upper and lower housing portions 14c, 14a may be limited to just low voltage DC power outlets 12b and/or 12c, such as shown in FIGS. 9 and 10. Further, in the case of a DC-only portable tower, AC-to-DC electrical converters 49 may be omitted, such as shown in FIGS. 17 and 21, since the output from battery 42 may be suitable for supplying low voltage DC power directly to outlets 12b, 12c, although circuit 48 may include an AC-to-DC electrical converter for converting incoming high voltage AC power to low voltage DC power for recharging the onboard battery 42. It would also be possible to provide a DC-to-AC electrical converter, so that a high voltage AC power outlet 12a may be supplied with suitable power from the onboard battery 42.

Optionally, and instead of (or supplemental to) recharging battery 42 using the direct-contact charging jack 44, a wireless electrical power receiver 50 may be provided in base housing 14a for recharging battery 42 and/or for directly energizing outlets 12, such as shown in FIG. 17. Wireless electrical power receiver 50 is operable to receive electrical power from a wireless electrical power transmitter 52. For example, wireless power transmission may be accomplished through inductive magnetic resonance coupling or electric field resonant capacitive coupling technologies. In another arrangement, wireless contact-based power transmission may be accomplished through spaced-apart electrical receiving contacts formed at or along the bottom panel 20 of base portion 14a, with electrical charging contacts formed at or along an upper surface of a compatible charging base.

To facilitate custom selections of electrical outlets 12 provided at base housing portion 14a and at upper housing portion 14c, portable tower 10 may include modular outlet mounting features such as shown in FIGS. 11-15B. In the illustrated embodiment of FIGS. 11-15B, portable tower 10 supports three high voltage AC electrical outlets 12a at its base housing portion 14a, and further supports at its upper housing portion 14c one high voltage AC electrical outlet 12a, two USB-A low voltage DC electrical outlets 12b in a single outlet assembly, and one USB-C low voltage DC electrical outlet 12c. In the upper housing portion 14c the electrical outlets 12a, 12b, 12c are supported in respective openings 60 formed in an outlet subhousing 62 that acts as a modular outlet support. In the illustrated embodiment, the high and low voltage outlets 12a, 12b are interchangeable in their respective openings 60, while the USB-A low voltage outlet 12c has a smaller opening 60 in the outlet subhousing 62. Optionally, separate window inserts 63 may be used to support smaller or different-shaped outlets, such as USB-A outlet 12c, in larger openings such as shown in FIG. 19. The use of window inserts 63 for adapting different outlets into same-size openings, to facilitate interchangeability, is more fully described in commonly-owned U.S. Pat. Nos. 7,182,633 and 7,559,795, both of which are hereby incorporated herein by reference in their entireties. Other structures and methods for adapting different outlets into modular spaces are disclosed in commonly-owned U.S. Pat. Nos. 8,444,432 and 8,480,429, both of which are hereby incorporated herein by reference in their entireties.

Figure 15:
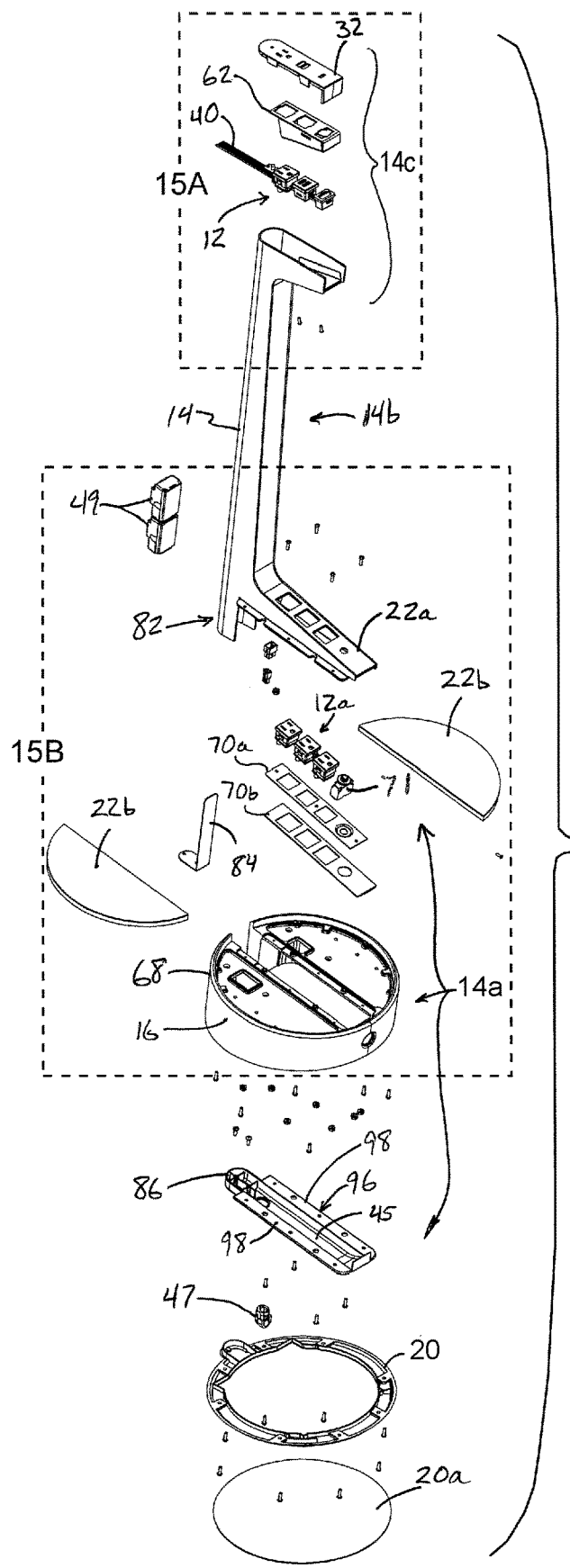
FIG. 15 is an exploded perspective view of the portable tower of FIG. 11.
Figure 15A:
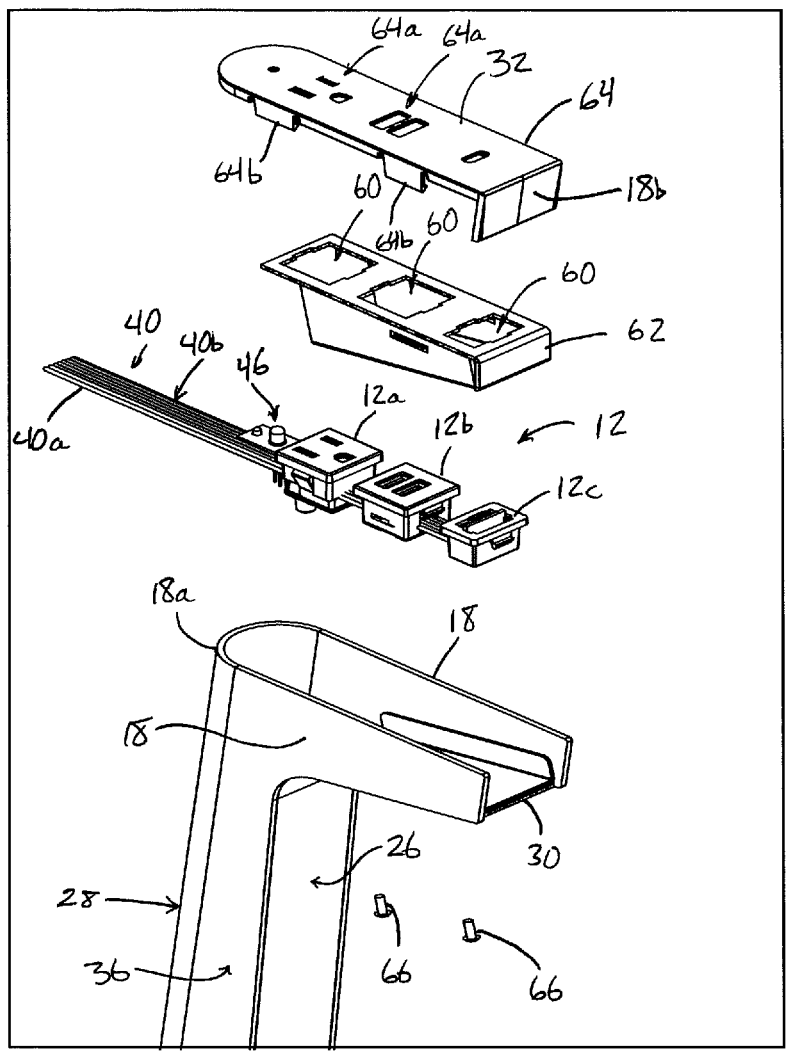
FIGS. 15A and 15B are enlarged views of the respective areas designated 15A and 15B in FIG. 15.

As shown in FIG. 15A, the upwardly-facing top surface 32 and distal end 18b of upper housing portion 14c are formed by a generally L-shaped upper housing cover 64 that has respective openings 64a formed in it to provide access to the respective openings of the outlets 12 and to provide a viewing passageway to a status light 46 (or multiple status lights 46 as shown in FIGS. 10, 17 and 21) that may be used to provide users with a visual indication of whether the outlets are energized, the remaining power available in the rechargeable battery, or other pertinent information as desired. Upper housing cover 64 includes downwardly-extending latch tabs 64b that engage respective side flanges 62a of the outlet subhousing 62, while the assembly of upper housing cover 64, outlet subhousing 62, and outlets 12 can be secured to rectangular outer periphery 18 and bottom housing surface 30 with mechanical fasteners 66.

Figure 15B:
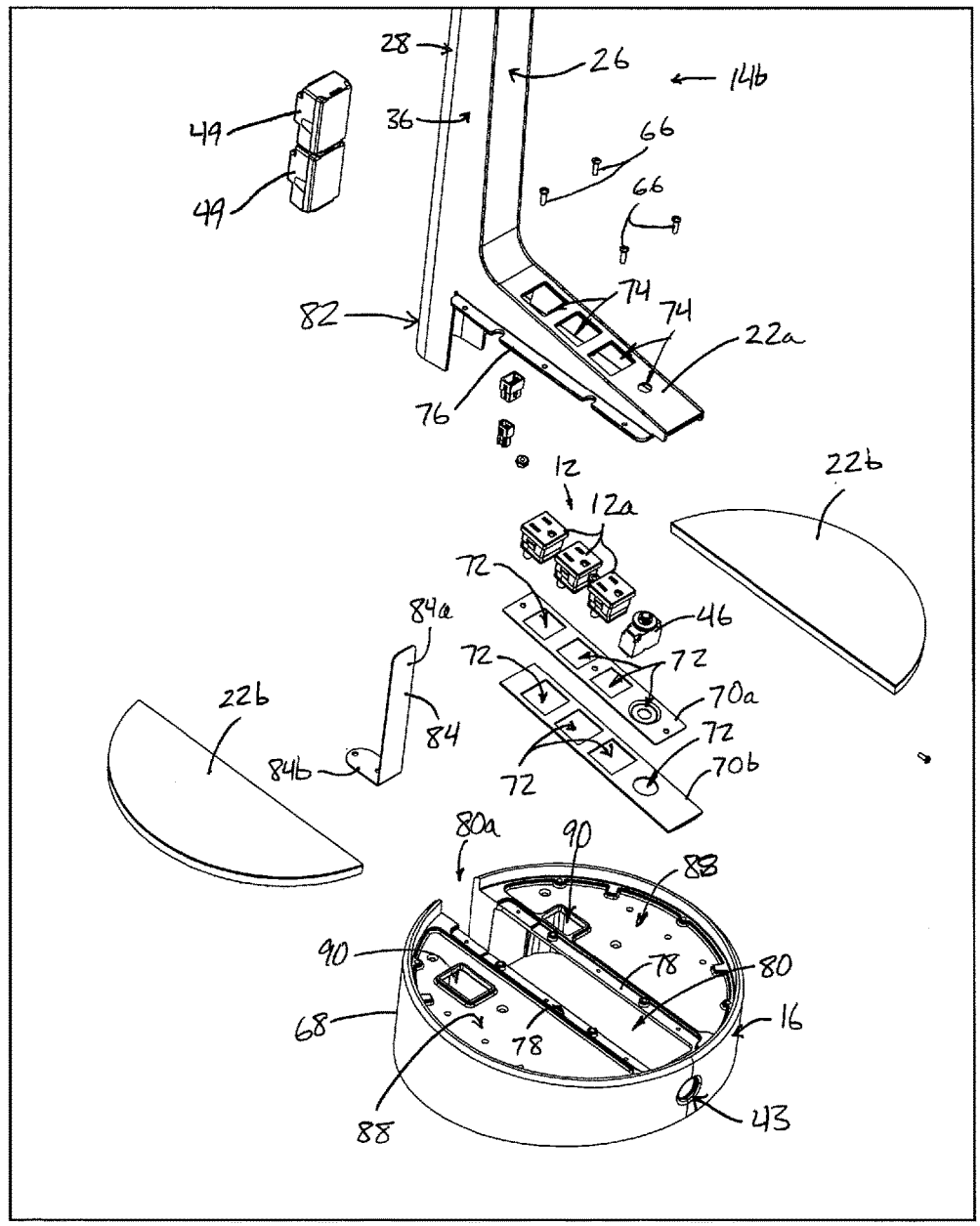

Referring now to FIGS. 15 and 15B, components that assemble together to form the entire lower region of portable tower 10 are shown, including a lower end of the central housing portion 14b that forms raised central outlet portion 22a, outboard top panel portions 22b, electrical outlets 12, base housing piece 68 that includes the generally circular outer periphery 16, and the bottom panel 20. A pair of support plates 70a, 70b have respective openings 72 for mounting outlets 12 and a circuit breaker 71 at raised central outlet portion 22a, thus acting as a modular outlet support. Central outlet portion 22a includes corresponding openings 74 through which upper faces or portions of the outlets 12 and circuit breaker 71 may protrude, such as shown in FIGS. 5, 6 and 11-14. Outlets 12 and circuit breaker 71 may be mounted to support plates 70a, 70b, and made accessible or visible through openings 74 in the raised central outlet portion 22a, in substantially the same manner as the outlets 12a, 12b, 12c and status light 46 are mounted in upper housing portion 14c using outlet subhousing 62 as described above. Although two support plates 70a, 70b are shown, it will be appreciated that a single support plate may also be used as a modular outlet support.

The lower end of the central housing portion 14b is mounted to the base housing piece 68 via mechanical fasteners 66 that secure a pair of flanges 76, which are located on either side of raised central outlet portion 22a, to respective spaced-apart ledges 78 on opposite sides of a central gap 80 that is formed through an upper region of the base housing piece, such as shown in FIG. 15B. A lower U-shaped extension 82 is formed as a downward extension of the outwardly-facing rounded surface 28 and portions of the side surfaces 36 of central housing portion 14b. Lower U-shaped extension 82 fits into a perimeter region 80a of the central gap 80. Thus, central housing portion 14b is stabilized relative to bottom housing portion 14c by the securing of flanges 76 to ledges 78 via fasteners 66, and by engagement of U-shaped extension 82 with portions of base housing piece 68 (including its outer periphery 16) on either side of the perimeter region 80a of the central gap 80.

Referring to FIG. 15, bottom panel 20 mounts to a bottom region of base housing piece 68 to enclose base cavity 24, and has skid pad 20a mounted to its underside. Bottom panel 20 secures to base housing piece 68 with mechanical fasteners, and includes a generally U-shaped upstanding wall 94 that is placed directly below the lower U-shaped extension 82 of central housing portion 14b. When portable tower 10 is assembled, the U-shaped extension 82 receives the U-shaped upstanding wall 94, with the engagement of wall 94 in extension 82 providing further stabilization for central housing portion 14b relative to base housing 14a.

An outlet enclosure piece 96 (FIG. 15) includes the aforementioned lower receptacle housing panel 45, an insert portion 86, and a pair of side flanges 98 that engage undersides of respective spaced-apart ledges 78. Outlet enclosure piece 96 cooperates with raised central outlet portion 22a to substantially enclose the outlets 12 and circuit breaker 71, and may be held in place by the same fasteners 66 that secure the flanges 76 of raised central outlet portion 22a, or by different fasteners.

Figure 5:
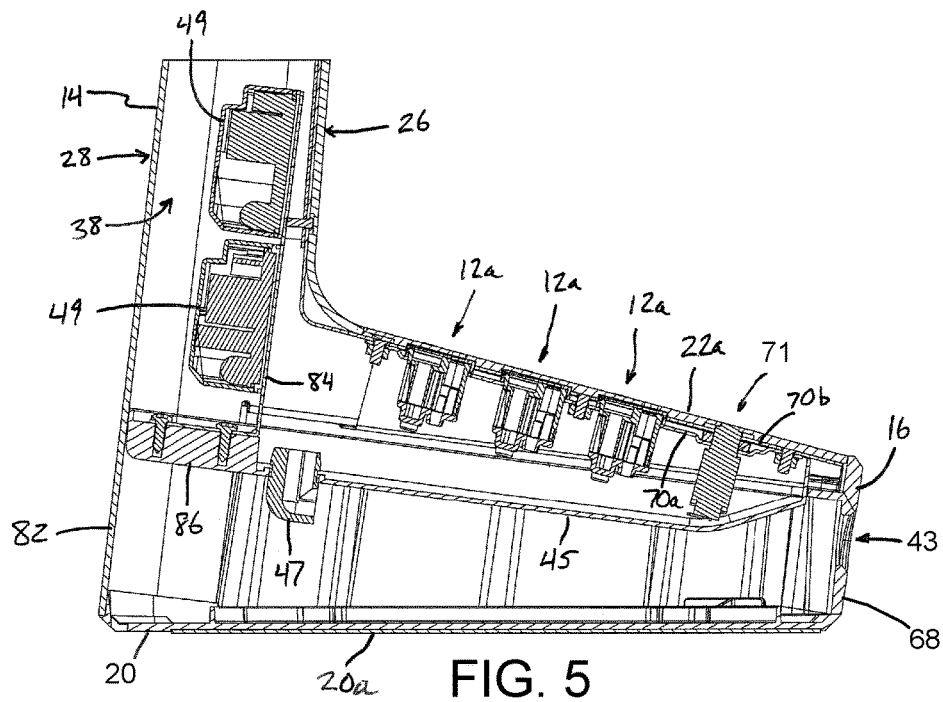
FIG. 5 is an enlarged sectional side view of a lower portion of the portable tower of FIG. 1.
Figure 6:
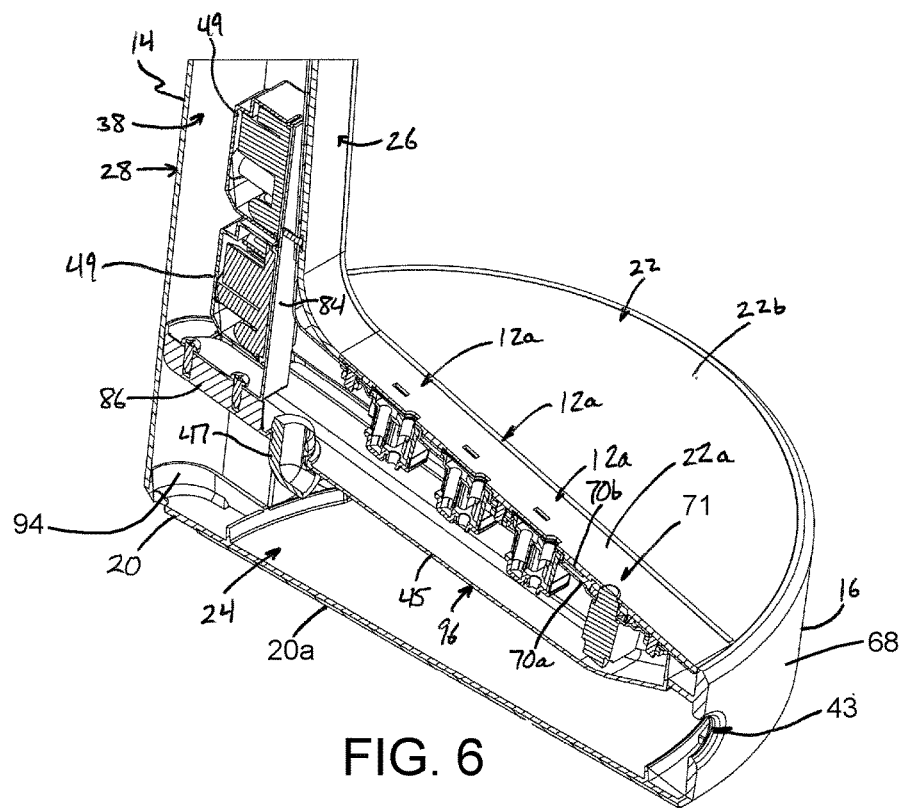
FIG. 6 is a perspective view of the lower portion of FIG. 5.

An L-shaped bracket 84 is optionally provided for mounting AC-to-DC electrical converters 49 inside the elongate central cavity 38 of central housing portion 14b, with converters 49 mounted to an upright leg 84a of the bracket 84, and with a lower leg 84b of the bracket 84 mounted to the insert 86 of outlet enclosure piece 96, which insert 86 extends rearwardly into the lower U-shaped extension 82 of central housing portion 14b (FIGS. 2, 5 and 6). Referring again to FIG. 15B, the outboard top panel portions 22b attach to correspondingly-shaped panel-receiving regions 88 of base housing piece 68, outboard of the spaced-apart ledges 78. Top panel portions 22b may be snap-fit into place at panel-receiving regions 88, or may be secured with additional fasteners that pass through respective openings formed in the panel-receiving regions 88 and into screw bosses formed in bottom surfaces of the panel portions 22b. Thus, panel portions 22b provide aesthetic covers for the upper surfaces of base housing 14a, and are replaceable with other panel portions having desirable colors, patterns, or other features. An opening 90 formed in each panel-receiving region 88 provides clearance for a respective portion of charging circuit 48, when so equipped.

With reference to FIGS. 16-21, various other options and features may be incorporated into the portable tower, without departing from the spirit and scope of the present invention. For example, and with reference to FIG. 16, a wireless electrical power transmitter 102 may be incorporated into a generally flat-topped base housing portion 114a, and capable of wirelessly charging a portable electronic device 104 that is positioned atop base housing portion 114a. In the embodiment of FIG. 16, portable tower 110 is equipped with an AC power cord 15 for engaging a wall outlet 17 and energizing the wireless electrical power transmitter 102, plus three high voltage AC outlets 12a along its upstanding central housing portion 114b, plus one high voltage AC outlet 12a, two low voltage USB-A DC outlets 12b, and one low voltage USB-C DC outlet 12c at its upper housing portion 114c. It will be appreciated that AC outlets 12a along the central housing portion 114b may be mounted in the same or substantially similar manner as the outlets 12 mounted in the upper and base housing portions 14c, 14a as described above, and may also be interchangeable with low voltage outlets. It is further envisioned that the portable tower 110 may be cordless such as shown in FIG. 17, in which an onboard energy storage device such as a battery (not shown) is incorporated along with the wireless electrical power transmitter 52 that is described above. However, when power for the outlets 12 on the portable tower 110 is sourced only from an onboard battery or the like, it may be desirable to omit high voltage AC outlets and instead provide only low voltage DC outlets 12b, 12c along with the wireless electrical power transmitter 102.

Optionally, and with reference to FIG. 18, another portable tower 210 includes an electric lamp 54 mounted in the upper housing portion 14c and powered by the same source that supplies power to outlets 12. The electric lamp 54 may be positioned along the downwardly-facing bottom surface 30 of the upper housing portion 214c, and is operable to project light onto the top panel of the base housing portion 214a, including any outlets 12 at a raised central outlet portion or the support surface of a wireless electrical power transmitter. A switch (not shown) may be provided to energize and de-energize the lamp as desired, or the lamp 54 may be automatically illuminated in response to a motion sensor or a device detecting the presence of a portable electronic device 104 at the base housing 214a, for example. It will further be appreciated that a power switch 56 may be incorporated into any of the embodiments described herein, one example of which is shown in FIG. 19, which further illustrates the use of adapter windows 63 described above. Switch 56 may be operable to selectively energize and de-energize any one or more of electrical outlets 12, lighting, a wireless electrical power transmitter, or the like.

Thus, the portable tower of the present invention provides convenient access to electrical outlets in substantially any desired location, including those without conventional electrical power outlets in close proximity. The portable tower can be rested along a floor, table, or other support surface, and when provided with onboard power storage capability such as a rechargeable battery, can be used to supply power to other devices without any connection to an outside power source. The portable tower has a housing that is shaped to facilitate manually grasping an upper end of the tower and quickly relocating the tower as desired. The principles of the present invention may be combined in various ways with aspects of the portable monument or towers described in commonly-owned and co-pending U.S. patent application Ser. No. 15/335,535, filed Oct. 27, 2016 (U.S. Pub. No. 2017/0047780), and its related applications including U.S. Pat. No. 9,484,751, both of which are hereby incorporated herein by reference in their entireties.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A portable tower with electrical capability comprises:
a housing comprising a base housing portion, an upstanding central housing portion extending upwardly from said base housing portion, and an upper housing portion at an upper end of said central housing portion;
an outlet subhousing mounted in said upper housing portion, said outlet subhousing defining a plurality of openings in spaced arrangement and configured to receive respective electrical outlets;
first and second electrical outlets supported in respective ones of said plurality of openings in said outlet subhousing at said upper housing portion;
an upper housing cover positioned over said outlet subhousing and cooperating with said upper housing portion to enclose said outlet subhousing, said upper housing cover defining a first opening providing access to said first electrical outlet and a second opening providing access to said second electrical outlet; and
electrical conductors extending through said base housing portion, through said upstanding central housing portion, and through said upper housing portion;
wherein said electrical conductors are in electrical communication with said first and second electrical outlets, and wherein said electrical conductors are in electrical communication with an electrical source for supplying electrical power or electronic signals to said first and second electrical outlets.

2. The portable tower of claim 1, wherein said portable tower comprises said source, and wherein said source comprises a rechargeable electrical energy storage device mounted in said base housing portion.

3. The portable tower of claim 2, further comprising at least one chosen from (i) a charging jack configured to receive electrical power from a connector in electrical communication with an external power source, and (ii) a wireless electrical power receiver disposed in said base housing portion and operable to receive electrical power from a wireless electrical power transmitter in electrical communication with an external power source.

4. The portable tower of claim 3, further comprising a charging circuit operable to selectively direct electrical power received from said charging jack or from said wireless electrical power receiver to said electrical energy storage device.

5. The portable tower of claim 1, further comprising an energizing circuit operable to selectively direct electrical power received from the source to said first and second electrical outlets.

6. The portable tower of claim 1, further comprising an electric lamp positioned in said upper housing portion and configured to illuminate at least said base housing portion.

7. The portable tower of claim 1, wherein said second electrical outlet comprises a wireless electrical power transmitter, and wherein said base housing portion comprises an upper support surface that is configured to support a portable electronic device during wireless charging of the portable electronic device by said wireless electrical power transmitter.

8. The portable tower of claim 1, further comprising an electrical power cord and plug in electrical communication with said first and second electrical outlets, wherein said plug is configured to engage the source to thereby receive electrical power or electronic data signals from the source.

9. The portable tower of claim 1, wherein said first electrical outlet comprises at least one low voltage DC power outlet.

10. The portable tower of claim 9, further comprising an electrical power converter in electrical communication with the source and with said at least one low voltage DC power outlet, wherein said electrical power converter is configured to receive a high voltage AC power input from the source and to supply a low voltage DC power output to said at least one low voltage DC power outlet.

11. The portable tower of claim 10, wherein said electrical power converter is mounted in said upstanding central housing portion.

12. The portable tower of claim 9, wherein said second electrical outlet comprises at least one high voltage AC power outlet.

13. The portable tower of claim 1, wherein said first and second electrical outlets are mounted at an upwardly-facing of said upper housing portion.

14. The portable tower of claim 1, further comprising a third electrical outlet at said upper housing portion, wherein at least two of said pluarlity of openings in said outlet subhousing are configured to interchangeably receive either of said first and third electrical outlets.

15. A portable tower with electrical capability comprises:
a housing comprising a base housing portion, an upstanding central housing portion extending upwardly from said base housing portion, and an upper housing portion at an upper end of said central housing portion;
an outlet subhousing mounted in said upper housing portion and defining first and second openings configured to receive respective electrical power outlets;
a first electrical outlet mounted in said first opening and a second electrical outlet mounted in said second opening; and
electrical conductors in electrical communication with said first and second electrical outlets, wherein said electrical conductors are in electrical communication with an electrical source;
wherein said upstanding central housing portion comprises a lower end portion positioned directly below said upper housing portion and comprising a pair of flanges on opposite sides of said lower end portion; and
wherein said base housing portion comprises a pair of spaced-apart ledges defining opposite sides of a central gap formed through an upper region of said base housing portion, said spaced-apart ledges configured to be secured to respective ones of said flanges of said upstanding central housing portion to couple said upstanding central housing portion to said base housing portion.

16. The portable tower of claim 15, wherein said portable tower comprises said electrical source, and wherein said electrical source comprises a rechargeable electrical energy storage device mounted in said base housing portion.

17. The portable tower of claim 16, wherein said first and second electrical outlets comprise low voltage DC power outlets.

18. The portable tower of claim 15, further comprising a third electrical outlet supported in said central gap of said base housing portion.

19. The portable tower of claim 18, wherein said third electrical outlet comprises a wireless electrical power transmitter, and wherein said base housing portion comprises an upper support surface that is configured to support a portable electronic device during wireless charging of the portable electronic device by said wireless electrical power transmitter.

20. The portable tower of claim 18, further comprising a support plate defining a lower receptacle opening, and an outlet enclosure piece having a pair of side flanges that engage undersides of respective one of said spaced-apart ledges of said base housing portion, wherein said support plate is positioned in said lower end portion of said upstanding central housing portion, said lower end portion of said upstanding central housing portion defining a lower receptacle opening aligned with said lower receptacle opening of said support plate, wherein said third electrical outlet is mounted in said lower receptacle opening of said support plate and is accessible through said lower receptacle opening of said lower end portion of said upstanding central housing portion, wherein said support plate cooperates with said lower end portion of said upstanding central housing portion to enclose a lower end region of said third electrical outlet, and wherein said third electrical outlet comprises at least one chosen from a high voltage AC electrical outlet and a low voltage DC electrical outlet.

* * * * *

UNITED STATES PATENT AND TRADEMARK OFFICE
CERTIFICATE OF CORRECTION

PATENT NO. : 10,263,373 B2  
APPLICATION NO. : 15/862455  
DATED : April 16, 2019  
INVENTOR(S) : Norman R. Byrne et al.

Page 1 of 1

It is certified that error appears in the above-identified patent and that said Letters Patent is hereby corrected as shown below:

In the Claims

Column 11  
Line 58, Claim 13, insert --surface-- after "upwardly-facing".

Signed and Sealed this  
Eighteenth Day of June, 2019

Andrei Iancu  
*Director of the United States Patent and Trademark Office*